3,356,857
APPARATUS FOR SWITCHING OVER OF A LOAD FROM ONE POWER SOURCE TO ANOTHER WITHOUT INTERRUPTION
Gunter Strasen, Sprendlingen, and Georg Gräber, Russelsheim, Germany, assignors to Varta Deutsche Edison-Akkumulatoren-Company Gesellschaft mit beschrankter Haftung, Frankfurt am Main, Germany
Filed July 8, 1965, Ser. No. 470,552
Claims priority, application Germany, July 11, 1964, V 26,347
1 Claim. (Cl. 307—66)

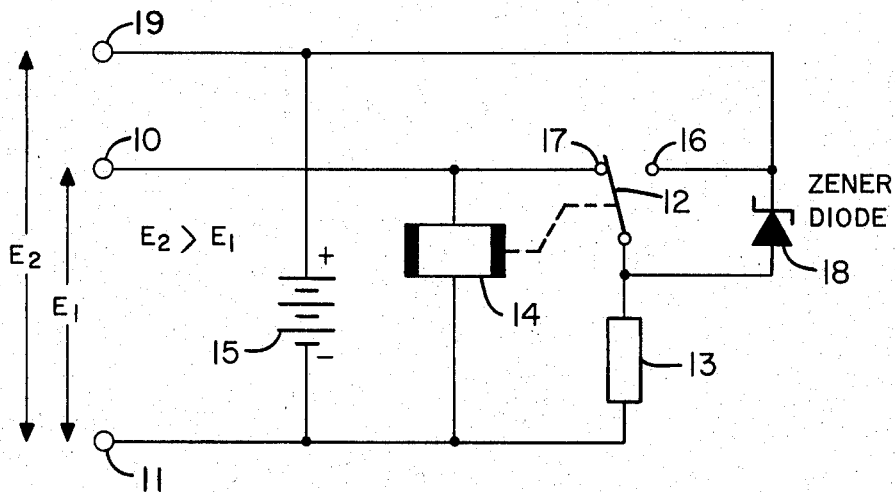

This invention relates generally to apparatus for automatically switching from a first or primary power source to a second or emergency power source so as to provide the load with uninterrupted service. In particular this invention is directed toward a circuit which operates in the foregoing manner to switch from the primary source of power to a battery which is usually being charged or at least being kept to a fully charged condition when not in use.

In a circuit of this nature a current sensitive relay is in line between the primary supply source and the load and its operation is dependent upon the presence of the primary source. This relay is used to switch over the load from the primary source to the standby or emergency secondary source such as a battery. The relay contact which is normally in the open condition when the relay is energized by the primary source is generally paralleled by a diode so that during the time in which the relatively slow acting relay armature moves to connect the load to the emergency battery output when the primary power source is down, the diode conducts from the battery to the load to supply the load with sufficient current so that its operation is uninterrupted. Once the relay armature closes the contact, the diode is shorted out and is no longer effectively in the circuit.

This circuit has a substantial disadvantage. This results from the fact that during the period when it is not in use the battery generally is being charged by a suitable power source so that it will be at its full state of charge when needed for the emergency use. However, the diode does put the battery and the charging source in circuit with the load so that in the event that the load varies appreciable it may draw from the battery and/or the charger source and there will be no assurance that when it is to be used for emergency the battery will be in a full state of charge. According to the present invention this disadvantage will be prevented by using a Zener diode as the diode which parallels the contact which is normally held open. As will be described later in greater detail, the Zener diode breakdown voltage will be adjusted or selected as necessary to satisfy correct operation.

This and other features of this invention will become apparent during the course of the following detailed description with reference to the single drawing which is an electrical schematic of the preferred embodiment of the invention.

A suitable primary source of DC voltage, E1, appearing across terminals 10 and 11 is applied through a relay armature 12 from contact 17 to load 13. The relay coil 14 which operates the armature 12 also is connected across terminals 10 and 11 and voltage source E1. As long as the voltage E1 is up, the relay coil 14 is energized so that the armature 12 is in the position illustrated, closing the circuit from the primary source E1 to the load 13.

Across terminals 19 and 11 another DC voltage, E2, is present. This generally is a DC charging voltage for battery 15 which is connected directly across terminals 19 and 11 in proper polarity for charge. As will be later pointed out in greater detail, E2 is selected to be somewhat higher than E1 and provides the charging current to keep the stand-by battery 15 at full charge during its period of non-use. Also connected to terminal 19 is the contact 16 of the relay which is in the open condition when the relay coil is energized, placing the armature 12 in contact with the other relay contact 17. Paralleling or jumpered across the contact 16 to the common contact of the armature 12 and to the load 13 is Zener diode 18. The breakdown voltage of the Zener diode 18 is selected to be slightly greater than the preselected usual difference between voltages E2 and E1. Therefore, the Zener diode is normally in the non-conducting state so that no energy flows from terminal 19 or the battery 15 to the load 13.

The circuit operates in the following manner: When there is a complete drop of the primary power supply voltage E1 across terminals 10 and 11, or when E1 drops low enough so that the difference between it and E2 exceeds the preselected breakdown voltage of the Zener diode 18, the latter begins to conduct immediately to provide power to the load 13 from the battery 15. Consequently, during the interim period when the relatively slow acting relay armature 12 is falling back to contact 16, due to deenergization of coil 14, to bring the battery 15 into the circuit for supplying power to the load 15, the load is not left without power. Once the armature 12 closes the circuit to contact 16 the Zener diode 18 is effectively shorted out of the circuit and thereafter the battery 15 supplies the energy to the load 13 through the armature 12.

When E1 has been restored so that once again it is able to supply the power to the load 13, relay coil 14 energizes and draws the armature 12 to contact 17. During the interval in which the armature 12 is traveling from contact 16 to contact 17, the battery 15 and/or voltage source E2 at terminal 19 will in the same manner as earlier described be able to provide the energy for the load 13 through the Zener diode 18. Once the armature 12 returns to contact 17, the Zener diode returns to its non-conductive state and the circuit operates in a normal manner.

Typically, and for illustrative purposes only, E1 may be in the order of 24 volts and E2 and the potential of battery 15 may be in the order of 27.5 volts so that the difference is in the order of 3.5 volts. Correspondingly, the breakdown voltage of the Zener diode 18 would be selected to be in the order of 4 volts.

The switching arrangement of this invention enables a switchover from normal primary power supply to a temporary or emergency battery operation without interrupting the supply of energy to the load and without using expensive, complicated and unreliable control equipment. Furthermore, the circuit operates in a manner such that during normal operation the standby battery and its charging source are separated from the normal load circuit which is being fed by the primary power supply so that the charging is independent of any load variations and there is assurance that the battery will be in full charge when required for emergency operation. Further, the battery is not used to supply the load with energy except during emergency type operation.

We claim:
Apparatus for switching over a load from a primary power source to a battery without interruption of serv- ice to the load comprising: a primary source of DC power for normally supplying energy to a load; a DC battery having a potential somewhat greater than that of said primary source; a second source of DC power connected across said battery for charging said battery; a load; a single-pole, double-throw relay having its energizing coil connected across said primary source, the switch contacts of said relay being arranged so that when the coil is energized by said primary source said load is connected to said primary source and when the coil is deenergized said load is connected to said battery; and a Zener diode having a conducting breakdown voltage only slightly greater than the potential difference between said battery and said primary source connected between said battery and said load.

References Cited
UNITED STATES PATENTS

| | | | |
|---|---|---|---|
| 1,874,374 | 8/1932 | Sole | 307—66 |
| 2,453,960 | 11/1948 | Arvidsson | 307—64 |
| 2,534,542 | 12/1950 | Bower | 307—64 |
| 3,189,788 | 6/1965 | Lady | 307—66 |
| 3,246,163 | 4/1966 | Rowe | 307—47 |

ORIS L. RADER, *Primary Examiner.*

T. J. MADDEN, *Assistant Examiner.*